United States Patent
Stern

(10) Patent No.: US 9,035,920 B2
(45) Date of Patent: May 19, 2015

(54) PRESSURE SENSITIVE STYLUS FOR A DIGITIZER

(71) Applicant: N-trig Ltd., Kfar-Saba (IL)

(72) Inventor: Yuval Stern, Kfar-Yona (IL)

(73) Assignee: N-trig Ltd., Kfar-Saba (IL)

( * ) Notice: Subject to any disclaimer, the term of this patent is extended or adjusted under 35 U.S.C. 154(b) by 0 days.

(21) Appl. No.: 13/908,063

(22) Filed: Jun. 3, 2013

(65) Prior Publication Data

US 2013/0265265 A1 Oct. 10, 2013

Related U.S. Application Data

(63) Continuation of application No. 12/546,753, filed on Aug. 25, 2009, now Pat. No. 8,536,471.

(60) Provisional application No. 61/136,401, filed on Sep. 3, 2008, provisional application No. 61/136,279, filed on Aug. 25, 2008.

(51) Int. Cl.
  *G06F 3/041* (2006.01)
  *G06F 3/0354* (2013.01)
  *G06F 3/044* (2006.01)

(52) U.S. Cl.
  CPC .......... *G06F 3/0416* (2013.01); *G06F 3/03545* (2013.01); *G06F 3/044* (2013.01)

(58) Field of Classification Search
  None
  See application file for complete search history.

(56) References Cited

U.S. PATENT DOCUMENTS

| | | | |
|---|---|---|---|
| 5,571,997 A | 11/1996 | Gray et al. | |
| 5,581,052 A | 12/1996 | Padula et al. | |
| 6,344,656 B1 | 2/2002 | Hopkins et al. | |
| 6,690,156 B1 | 2/2004 | Weiner et al. | |
| 6,707,451 B1 | 3/2004 | Nagaoka | |
| 7,202,862 B1 | 4/2007 | Palay et al. | |
| 7,210,046 B2 | 4/2007 | Truong | |
| 7,279,646 B2 | 10/2007 | Xu | |
| 7,292,229 B2 | 11/2007 | Morag et al. | |
| 7,372,455 B2 | 5/2008 | Perski et al. | |
| 8,228,299 B1 * | 7/2012 | Maloney et al. | 345/173 |
| 2005/0166076 A1 * | 7/2005 | Truong | 713/320 |
| 2006/0068851 A1 | 3/2006 | Ashman, Jr. | |
| 2006/0109252 A1 | 5/2006 | Kolmykov-Zotov et al. | |
| 2007/0014490 A1 | 1/2007 | Silverbrook et al. | |
| 2007/0085836 A1 * | 4/2007 | Ely | 345/173 |
| 2007/0146351 A1 * | 6/2007 | Katsurahira et al. | 345/179 |
| 2007/0176909 A1 * | 8/2007 | Pavlowski | 345/179 |

(Continued)

FOREIGN PATENT DOCUMENTS

| | | |
|---|---|---|
| EP | 2204724 | 7/2010 |
| WO | WO 2010/086035 | 8/2010 |

OTHER PUBLICATIONS

Notice of Allowance Dated Mar. 22, 2013 From the US Patent and Trademark Office Re. U.S. Appl. No. 12/546,753.

(Continued)

*Primary Examiner* — Joseph Haley
*Assistant Examiner* — Emily Frank

(57) ABSTRACT

A pressure sensitive stylus, comprises a movable tip that recedes within a housing of the stylus in response to user applied contact pressure, wherein a displacement of the tip along an axis on which it recedes is a function of the applied contact pressure, and an optical sensor enclosed within the housing for optically sensing the displacement of the tip and for providing output in response to the sensing.

14 Claims, 12 Drawing Sheets

(56) References Cited

U.S. PATENT DOCUMENTS

2008/0128180 A1  6/2008  Perski et al.
2009/0078476 A1  3/2009  Rimon et al.
2010/0155153 A1  6/2010  Zachut

OTHER PUBLICATIONS

Official Action Dated Jul. 3, 2012 From the US Patent and Trademark Office Re. U.S. Appl. No. 12/546,753.

Official Action Dated Oct. 19, 2012 From the US Patent and Trademark Office Re. U.S. Appl. No. 12/546,753.

Official Action Dated Jan. 31, 2012 From the US Patent and Trademark Office Re. U.S. Appl. No. 12/546,753.

Supplemental Notice of Allowability Dated May 8, 2013 From the US Patent and Trademark Office Re. U.S. Appl. No. 12/546,753.

International Search Report and the Written Opinion Dated Mar. 6, 2014 From the International Searching Authority Re. Application No. PCT/IL2013/050836.

IBM "Automatic Switching Stylus for Pen-Based Computer Systems", IBM Technical Disclosure Bulletin, XP000419075, 36(12): 583-584, Dec. 1, 1993.

* cited by examiner

PRESSURE SENSITIVE STYLUS FOR A DIGITIZER

RELATED APPLICATIONS

This application is a continuation of U.S. patent application Ser. No. 12/546,753 filed on Aug. 25, 2009, which claims the benefit of priority under section 35 U.S.C. §119(e) of U.S. Provisional Patent Application Nos. 61/136,401 filed on Sep. 3, 2008 and 61/136,279 filed on Aug. 25, 2008, the contents of which are incorporated herein by reference in their entirety.

FIELD OF THE INVENTION

The present invention, in some embodiments thereof, relates to signal transmitting styluses used for interaction with digitizer sensors and more particularly, but not exclusively to styluses that transmit signals responsive to pressure exerted on its tip.

BACKGROUND OF THE INVENTION

Electromagnetic styluses are known in the art for use and control of a digitizer. Position detection of the stylus provides input to a computing device associated with the digitizer and is interpreted as user commands. Position detection is performed while the stylus tip is either touching and/or hovering over a detection surface of the digitizer. Often, the digitizer is integrated with a display screen and a position of the stylus over the screen is correlated with virtual information portrayed on the screen.

U.S. Pat. No. 5,571,997 entitled "Pressure sensitive pointing device for transmitting signals to a tablet" the contents of which is incorporated herein by reference, describes a pressure sensitive pointing device or pen for use with an electronic tablet that determines the position of the pointing device on the surface of the tablet. The pointing device incorporates a variable reluctance circuit responsive to the force exerted on the pen point for modulating a radiating frequency, emanating from the pen, in proportion to the force.

U.S. Pat. No. 7,292,229 entitled "Transparent Digitizer" which is assigned to N-trig Ltd., the contents of both which is incorporated herein by reference, describes a passive electromagnetic stylus which is triggered to oscillate at a resonant frequency by an excitation coil surrounding a digitizer. The oscillating signal is sensed by the digitizer. The stylus operates in a number of different states including hovering, tip touching, right click mouse emulation, and erasing. The various states are identified by dynamically controlling the resonant frequency of the stylus so that the stylus resonates at a different frequency in each state. A position of the stylus, e.g. the stylus' tip with respect to the digitizer sensor is determined based on signals sensed from sensor.

U.S. Patent Application Publication No. 20080128180 entitled "Position Detecting System and Apparatuses and Methods for Use and Control Thereof" assigned to N-Trig Ltd., the contents of which is incorporated herein by reference, describes a stylus that emits an oscillation frequency that can be picked up by a digitizer sensor and used to determine its position on the sensor. The stylus includes a variable element, e.g. a resistor, capacitor, or an inductor, that is responsive to pressure exerted on the stylus tip by the user and triggers changes in the frequency emitted by the stylus. The digitizer system is operable to discern between different frequencies emitted by the stylus to determine a position of the stylus and a pressure exerted on the stylus tip by the user.

SUMMARY OF THE INVENTION

According to an aspect of some embodiments of the present invention there is provided a pressure sensitive stylus and a method for a stylus to sense a pressure and/or a change in pressure exerted on its tip with an optical sensor. According to some embodiments of the present invention, the stylus tip is constructed to slightly recede, e.g. in an axial direction in response to contact pressure and an axial position of the tip is optically tracked by the stylus. It is typically desirable to minimize axial movement of the stylus tip in response to variable force applied on it so that a "stiff" pen feel can be achieved which users find most natural. The present inventors have found that the optical sensor provides for increased sensitivity and accuracy in detecting contact pressure as compared to prior art devices. The increased sensitivity and accuracy provides for determining pressure, lack of pressure and/or a change in pressure exerted on the stylus tip with only slight axial movement of the pen tip, e.g. in the order of magnitude of micro meters.

Typically, it is desirable to accurately differentiate between no applied pressure on the tip that occurs during a hover operational state of the stylus and applied pressure that occurs during a tip operational state when touching with a digitizer sensor. According to some embodiments of the present invention, output readings from the optical sensor are dynamically adjusted to compensate for drift due to mechanical fatigue and environmental conditions prior to encoding and transmitting a pressure state signal from the stylus.

An aspect of some embodiments of the present invention is the provision of a pressure sensitive stylus, comprising: a movable tip that recedes within a housing of the stylus in response to user applied contact pressure, wherein a displacement of the tip along an axis on which it recedes is a function of the applied contact pressure; and an optical sensor enclosed within the housing for optically sensing the displacement of the tip and for providing output in response to the sensing.

Optionally, the output corresponds to at least one of a pressure applied on the tip and a displacement of the tip.

Optionally, the displacement of the tip ranges between 0-500 μm.

Optionally, the displacement includes at least a first range of displacements corresponding to a hover operational state and a second range of displacements corresponding to a tip operational state of the stylus.

Optionally, the first range of positions corresponds to displacements between 0-50 μm from a neutral position where pressure is applied along an axis of the receding.

Optionally, the sensor provides output for differentiating between a plurality of tip displacements or applied pressures in the tip operation state.

Optionally, the stylus comprises an encoder for encoding the tip displacement or applied pressure in a signal for transmission.

Optionally, the encoding is analog encoding.

Optionally, the stylus comprises a digital encoder for encoding information in a signal for transmission.

Optionally, the digital encoding is by FSK.

Optionally, the information includes at least one of: stylus identification information, information indicating an erase operational mode, information indicating a right click operational mode, information indicating a color, information indicating a battery charge state and displacement or applied pressure of the tip.

Optionally, the signal for transmission includes a plurality of pulsed signals, wherein at least a first portion of the pulsed signals are digitally encoded and second portion of the pulsed signals are encoded by analog encoding.

Optionally, the signal for transmission includes a pulsed synchronization signal.

Optionally, the stylus comprises a transmission unit for transmitting the signal for transmission.

Optionally, the transmitting unit transmits at a first report rate during a sensed hover operational state and at a second higher report rate during a sensed tip operational state.

Optionally, the transmission unit is operative to form an electric field in a gap located between the tip and the housing, wherein the electric field is synchronized with the signal for transmission.

Optionally, the optical sensor includes at least one optical emitter-detector pair between which a distal tip element moves, wherein the distal tip element is a distal end of the tip or an element in physical communication with the tip of the stylus.

Optionally, the distal tip element obstructs a transmission cross-section of the detector in response to a maximum allowed pressure receding of the tip and clears the transmission cross-section of the detector in response to the no receding of the tip.

Optionally, the amount of light detected on the detector is a function of the displacement.

Optionally, the distal tip element includes an aperture.

Optionally, the aperture is aligned with the emitter-detector pair in response to maximum allowed receding of the tip of the stylus.

Optionally, the stylus comprises a calibration unit for dynamically adjusting parameters of the sensor in response to changes in performance of components of the stylus, wherein the dynamic adjusting is performed during user operation of the stylus.

Optionally, the optical sensor includes at least one optical emitter-detector pair between which a distal tip element moves, and wherein parameters include at least one of pulse duration of light emitted by the emitter, intensity of light emitted by the emitter, and amplification of output of the detector.

Optionally, the stylus operates as a user interaction to a digitizer sensor.

Optionally, the digitizer sensor is a capacitive based sensor.

An aspect of some embodiments of the present invention is the provision of a method for determining a pressure applied on a stylus, the method comprising: providing a stylus tip that recedes within a housing of the stylus in response to user applied contact pressure, wherein a displacement of the tip along an axis on which it recedes is a function of the applied contact pressure; optically sensing the displacement of the tip; and providing output in response to the sensing.

Optionally, the output corresponds to at least one of a pressure applied on the tip and the displacement of the tip.

Optionally, the displacement of the tip ranges between 0-500 µm.

Optionally, the method comprises sensing at least a hover operational state of the stylus corresponding to a first range of displacements and a tip operational state of the stylus corresponding to a second range of displacements.

Optionally, the first range of positions corresponds to displacements between 0-50 µm from a neutral position where pressure is applied along an axis of the receding.

Optionally, the sensor provides output for differentiating between a plurality of tip displacements or applied pressure in the tip operation state.

Optionally, the method comprises encoding the sensed tip position or applied pressure in a signal for transmission.

Optionally, the encoding is analog encoding.

Optionally, the method comprises digitally encoding information in a signal for transmission.

Optionally, the digital encoding is by FSK.

Optionally, the information includes at least one of: stylus identification information, information indicating an erase operational mode, information indicating a right click operational mode, information indicating a color, information indicating a battery charge state and the displacement or applied pressure on the tip.

Optionally, the signal for transmission includes a plurality of pulsed signals, wherein at least a first portion of the pulsed signals are digitally encoded and second portion of the pulsed signals are encoded by analog encoding.

Optionally, the signal for transmission includes a pulsed synchronization signal.

Optionally, the method comprises transmitting the signal for transmission at a first report rate during a sensed hover operational state of the stylus and at a second higher report rate during a sensed tip operational state.

Optionally, the transmission unit is operative to form an electric field in a gap located between the tip and the housing, wherein the electric field is synchronized with the signal for transmission.

Optionally, the method comprises dynamically adjusting parameters of the sensor in response to changes in performance of components of the stylus, wherein the dynamic adjusting is performed during user operation of the stylus.

Optionally, the optical sensor includes at least one optical emitter-detector pair between which a distal tip element moves, and wherein parameters include at least one of pulse duration of light emitted by the emitter, intensity of light emitted by the emitter, and amplification of output of the detector.

Optionally, the stylus operates as a user interaction to a digitizer sensor.

Optionally, the digitizer sensor is a capacitive based sensor.

An aspect of some embodiments of the present invention is the provision of a pressure sensitive stylus, comprising: a movable tip that recedes within a housing of the stylus in response to user applied contact pressure, wherein a displacement of the tip along an axis on which it recedes is a function of the applied contact pressure; a sensor enclosed within the housing for sensing the displacement of the tip and for providing output in response to the sensing; and an encoder for encoding the displacement or applied pressure in a signal for transmission, wherein the encoding is analog and digital encoding;

Optionally, the sensor is an optical sensor.

Optionally, the sensor is a capacitive sensor.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1A:
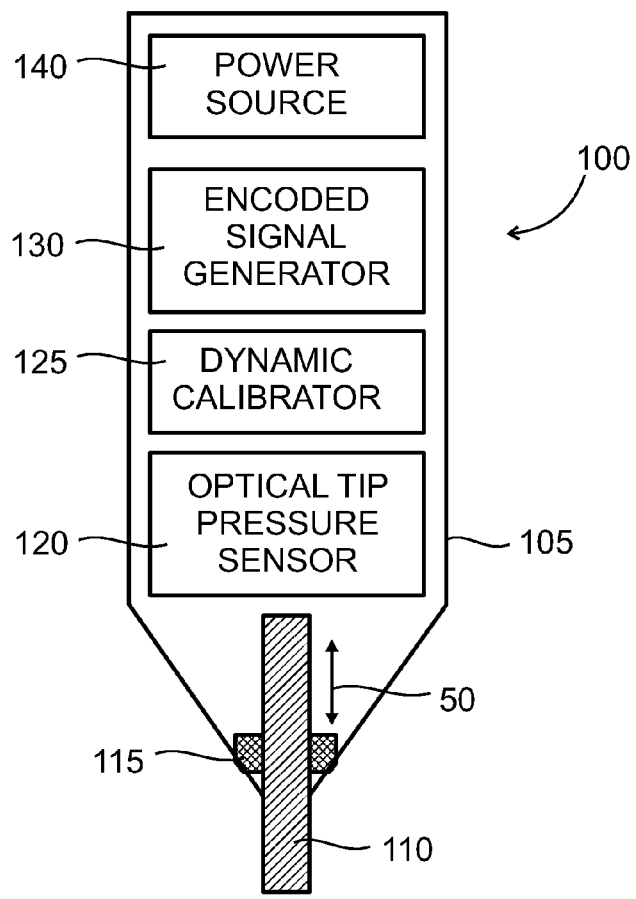
FIG. 1A is an exemplary simplified diagram of a pressure sensitive stylus in accordance with some embodiments of the present invention.

The present invention, in some embodiments thereof, relates to signal transmitting styluses used for interaction with digitizer sensors and more particularly, but not exclusively to styluses that transmit signals responsive to pressure exerted on its tip.

An aspect of some embodiments of the present invention provides for tracking an axial positioning of a stylus tip with an optical sensor. According to some embodiments of the present invention, the optical sensor includes an emitter-detector pair positioned within a housing or frame of the stylus and on opposite sides of a distal end of the stylus tip or opposite sides of an element that is in physical communication with the distal end of the stylus tip. For convenience, the term "distal tip element" will be used to refer to the distal end of the stylus tip or other element in physical contact with the stylus tip and used to determine a pressure state of the stylus tip.

According to some embodiments of the present invention, the distal tip element moves in between an optical emitter-detector pair and obstructs the transmission cross-section between the emitter-detector pair by a variable degree in response to axial movement of the stylus tip. In some exemplary embodiments, the distal tip element includes an aperture having at least a portion that is aligned with the line of site between the emitter-detector pair. Optionally, the size, shape and/or rotation of the portion vary for different axial position of the stylus tip. In one exemplary embodiment, the aperture is tapered along an axial direction of the tip so that the portion of the aperture that is aligned with the transmission cross-section either widens or narrows for different levels axial positions of the tip.

Typically, the stylus tip is spring loaded and the relationship between displacement of the distal tip element and contact pressure applied on the tip is pre-determined. Similarly, the relationship between output of the detector (of the emitter-detector pair) and the pressure applied on the tip is pre-determined. In some exemplary embodiments, the relationships are defined to provide a working range of axial positions (contact pressures) that can be used and discerned during operation with the stylus. Optionally, working range only provides for differentiating between a neutral state (hover state) and receded state (touch state) of the stylus tip.

An aspect of some embodiments of the present invention provides for dynamically adjusting and/or updating the relationship between output of the detector and the pressure applied on the tip during operation of the stylus. Typically, adjustments are required due to changes in the mechanical response of the stylus over use and/or due to changes in the performance of the emitter-detector pair, e.g. due to changes in temperature and aging of components. In particular changes in the performance of electrical, optical or mechanical components of the stylus may lead to errors in differentiating between a hovering state and a touching or contact state of the stylus tip. In some exemplary embodiments errors may be due to mechanical, electrical and optical tolerances.

According to some embodiments of the invention, an output level reflecting hovering (a neutral state) is dynamically adjusted. The method for dynamic calibration is based on the present inventor's observation that the periods of time that a user exerts contact pressure on the stylus over the course of operation of a digitizer sensor is relatively small as compared to the periods of time and overall time that no contact pressure is exerted on the stylus, e.g. the stylus is not pressed against the sensing surface.

In some exemplary embodiments, a neutral state (a hover state) is adjusted to a level that was previously associated with a receded tip in response to obtaining steady and/or average readings indicating a receded tip for a pre-defined period of time, e.g. 1 to 10 minutes. Alternatively, in some exemplary embodiments, a neutral state is adjusted to a level in the opposite direction (beyond a reading defining hover) in response to a single reading or a small number of consecutive readings obtained. Typically, these adjustments are made in response to a mistake in defining a hover and/or tip state while corrections based on prolonged readings is for compensating for changes due to tolerances.

According to some embodiments of the present invention, the associated axial position or pressure level is encoded and transmitted by the stylus. Optionally, the encoding is analog encoding, e.g. using Frequency Modulation (FM) or a specific frequency for different pressure levels or tip positions. Optionally, the encoding is digital encoding, e.g. Frequency Shift Keying (FSK), Phase Shift Keying (PSK), or Amplitude Shift Kying (ASK). In some exemplary embodiments, the pressure level signal is transmitted separately from the signal transmitted by the stylus for positioning, e.g. immediately after. Optionally, the pressure level signal is transmitted at a rate other than the rate used to transmit the positioning signal of the stylus.

An aspect of some embodiments of the present invention provides for a signal transmitting stylus that transmits analog encoded information regarding axial position and/or pressure level of its tip. Optionally, the stylus transmits additional digitally encoded information such as identification; right click state; and an eraser state. Optionally the right click state command and/or eraser state command are initiated by buttons and/or switches included on the stylus housing. In some exemplary embodiments, the digitally encoded information is included at the end of an analog signal transmitted by the stylus. Typically, the analog signal is used to determine position of the stylus on a digitizer sensor. Optionally, additional information is encoded digitally and transmitted such as color, right click and erase mode. Typically, the stylus is battery operated and/or self powered. Typically, information regarding battery health is encoded digitally and transmitted at the end of the analog signal transmitted by the stylus. Typically, signals transmitted by the stylus are picked up by a digitizer sensor and the encoded information is deciphered on the digitizer level. Optionally, the encoded information is deciphered by a host associated with the digitizer sensor.

Reference is now made to FIG. 1A showing an exemplary simplified block diagram of a pressure sensitive stylus in accordance with some embodiments of the present invention. According to some embodiments of the present invention, a stylus 100 includes a housing 105, a movable tip 110, an optical tip pressure sensor 120, a signal generator 130 and a power source 140.

According to some embodiments of the present invention, stylus 100 is powered by power source 140. Typically, power source 140 includes one or more batteries, e.g. 4A alkaline battery. Optionally rechargeable batteries are used. Optionally, stylus 100 additionally includes a voltage stabilizer to stabilize voltage from power source 140. In some exemplary embodiments, power source 140 includes an energy pick-up circuit which supplies energy to the stylus from an external signal, e.g. a signal supplied by the digitizer system. Optionally, the power source 140 is similar to those described in incorporated Patent Publication 20080128180.

Typically, tip 110 recedes into housing 105 in axial direction 50 in response to applied contact pressure by a user operating the stylus, e.g. pressing tip on a surface and is subsequently released when the contact pressure is released, e.g. a hovering state or non-operational state of the stylus. Typically, during axial movement tip 110 is engaged with a resilient element 115, e.g. a spring whose properties are selected to obtain a desired relationship between contact pressure and axial displacement. Typically, applied contact pressure ranges between 0-2 Kg-force, e.g. 0-350 gram-force. According to some embodiments of the present invention, the resilient element is selected to provide for axial displacement ranging between 0-500 μm, e.g. 0-250 μm in response to range of applied contact pressure between 0-2 Kg-force, e.g. 0-350 gram-force. In some exemplary embodiments, the relationship between tip displacement and contact pressure is a not linear. Optionally, an initial pressure, e.g. 15 gram force, displaces the tip 50 μm and additional pressure up to 350 gram-force displaces the tip an additional 150 μm-200 μm.

According to some embodiments of the present invention, optical tip pressure sensor 120 is operable to sense axial positioning (or displacement from neutral state) of tip 110 or other distal tip element engaged with tip 110, and to output a signal proportional to the axial positioning. Typically, signal generator 130 generates an encoded signal based on output from sensor 120 and the signal is transmitted for pick up by an associated digitizer. In some exemplary embodiments, the signal generator unit 130, additionally generates and encodes signals indicating a state of one or more switches on stylus 100, e.g. to indicate erase mode and/or mouse right click mode. According to some embodiments of the present invention, signal generator 130 produces a pulsed oscillating signal. Typically, signal generator 130 includes and/or is in communication with an oscillator to produce an AC signal. In some exemplary embodiments, encoding is provided by FM, e.g. FM of a pulsed signal. Optionally encoding is digital and is provided by FSK, PSK and/or ASK. In some exemplary embodiments, both analog and digital encoding is used. Optionally, analog encoding is used for encoding tip pressure, e.g. by associating each pressure level with a pre-defined frequency and digital encoding is used to encode erase, right click mode, and battery health. In some exemplary embodiments, a signal generator is not included in stylus 100 and encoding is provided by a Voltage Control Oscillator (VCO) that modulates a frequency of a voltage output of optical tip pressure sensor 120.

According to some embodiments of the present invention, stylus 100 includes a calibration unit 125 for calibrating and/or adjusting output an/or parameters of the optical tip pressure sensor in response to changes in performance of stylus components, e.g. mechanical, electrical, and/or optical components of the sensor. Optionally, calibration unit 125 provides for maintaining altering the output signal of the emitter in response to a drift in the output. Calibration methods in accordance with some embodiments of the present invention are described in more detailed herein below.

Figure 1B:
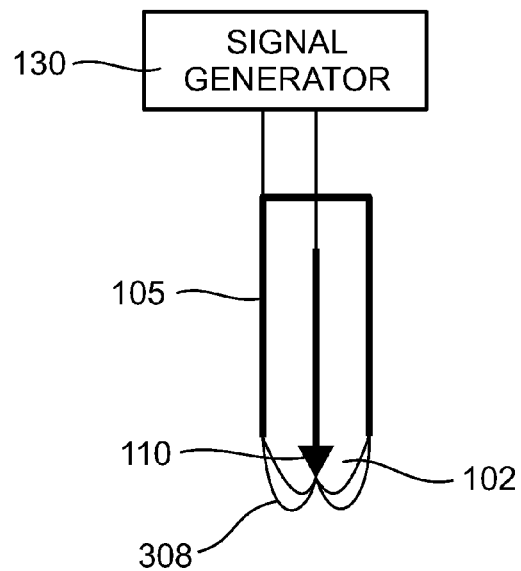
FIG. 1B is an exemplary schematic diagram showing signal transmission via stylus tip used in accordance with some embodiments of the present invention.

FIG. 1B is an exemplary schematic diagram showing signal transmission via a stylus tip in accordance with some embodiments of the present invention. In some exemplary embodiments, a signal generated by signal generator 130 is transmitted close to tip 110 by a signal generation source to provide transmission at localized locations on an associated digitizer. According to some embodiments of the present invention, one end of the signal generation source is connected to stylus tip 110 (which preferably comprises a conductive material) while the other end is electrically connected to frame 105 (which likewise comprises conductive material). An electric field 308, synchronized to the generated signal, is formed in a gap 102 located between the tip 110 and the frame 105. The geometric dimensions of the gap and the consequent field are relatively small so that the field source can be substantially close to the stylus tip and thereby provide a concentrated signal at the tip. Signals transmitted by the stylus can be picked up by a digitizer or other sensing surface and the position and contact pressure of the stylus at that position can be conveyed to the digitizer. Optionally, stylus 100 includes a separate antenna and does not use tip 110 for transmitting output signals.

In some embodiments of the present invention, stylus 100 includes a dedicated ASIC. Optionally, an encoding unit, e.g. FSK encoding unit is embedded in ASIC. Optionally, stylus 100 additionally or alternatively includes discrete circuits, e.g. formed on a PCB unit. Typically, the ASIC is mounted on the PCB unit.

Figure 2A:
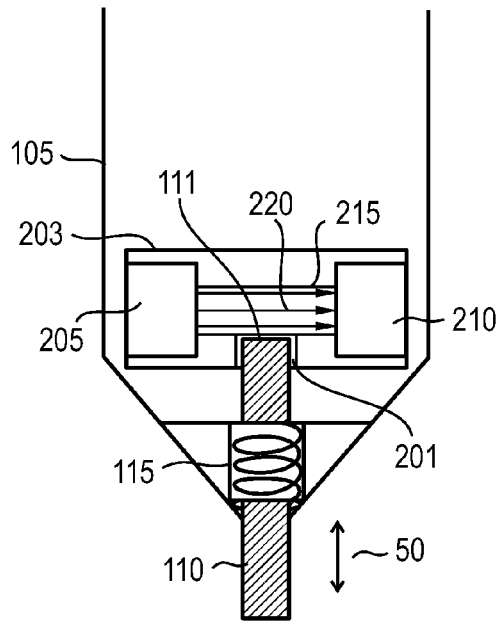
FIGS. 2A, 2B, and 2C are simplified schematic diagrams showing tip position sensing with an exemplary optical tip pressure sensor for three different tip positions in accordance with some embodiments of the present invention.
Figure 2B:
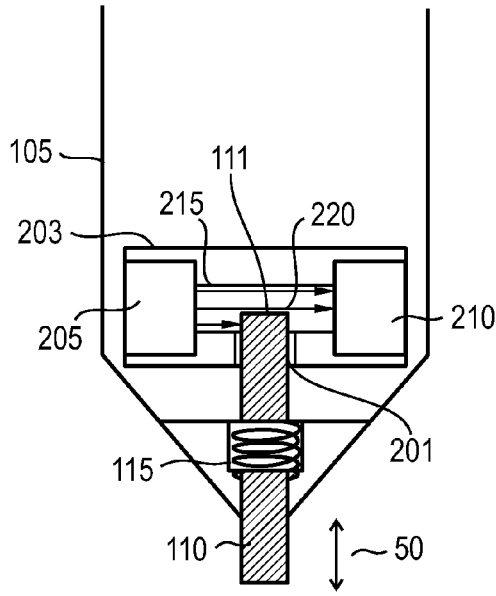
Figure 2C:
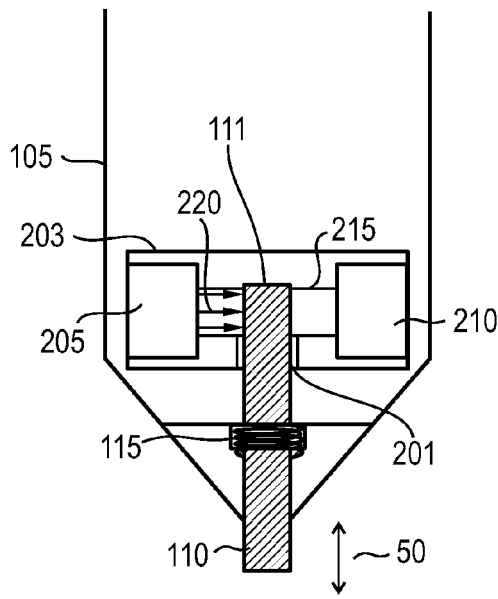

Reference is now made to FIG. 2A-2C simplified schematic diagrams showing tip position sensing with an exemplary optical tip pressure sensor for three different tip positions in accordance with some embodiments of the present invention. According to some embodiments of the present invention, optical tip pressure sensor 120 includes an emitter 205 emitting an optical signal, e.g. light rays 220 toward a detector 210. In some exemplary embodiments, emitter 205 and detector 210 are encased in an inner mechanical housing 203. Typically, housing 203 includes an opening 201 through which distal end 111 of tip 110 (or other distal tip element) can be received. Typically, the tip opening 201 conforms to the diameter of tip 110 (or other distal tip element), e.g. 1 mm opening. Optionally, housing 203 further includes opening 215 defining a detection volume through which light emitted from emitter 205 can be received by detector 210. Optionally, an opening diameter of 0.05-1000 mm is used, e.g. 250 µm. Optionally, a lens is used to focus emitter output toward detector 210. Optionally, emitter 205 and detector 210 are positioned in close proximity to each other to provide for receiving output from emitter 205 on detector 210. Mechanical housing 203 provides mechanical stability for components of the optical sensor as well as protection from ambient light that may interfere with optical detection. Typically, emitter 205 and detector 210 are aligned so that while opening 215 is unobstructed, substantially all of light rays 220 emitted by emitter 205 may be received by detector 210.

Typically, emitter 205 is a Light Emitting Diode (LED), a laser diode, a photo resistor, a PIN photodiode, or other diode and detector 210 is a photodetector or any light source having a matching receiver.

According to some exemplary embodiments, the emitter 205 and detector 210 are positioned proximal to a distal end 111 of tip 110, e.g. on either side of distal end 111, so that distal end 111 crosses opening 215 as it recedes into housing 105. Typically, movement of the tip is generally perpendicular to a line of site direction of the emitter-detector pair (indicated by arrows 220).

In some exemplary embodiments, opening 215 is unobstructed while tip 110 is in a neutral, e.g. hovering state (FIG. 2A). As contact pressure is exerted on tip 110, opening 215 is partially obstructed at low contact pressures (FIG. 2B) and optionally fully obstructed at maximum or high contact pressure (FIG. 2C). Typically, the relationship between positioning in axial direction 50 and contact pressure is determined based on known properties of resilient element 115 or mechanical element that engages tip 110 and provides counter force to an applied contact pressure in axial direction 50. In some exemplary embodiments, the initial position of distal tip end 111 or opening 215 is defined so that a change in detector output is obtained only after an initial threshold contact pressure is applied. For example, distal tip may only begin to obstruct opening 215 after a 2-20 gram force is applied and/or after an initial displacement of 20 µm-70 µm, e.g. 50 µm.

Figure 3A:
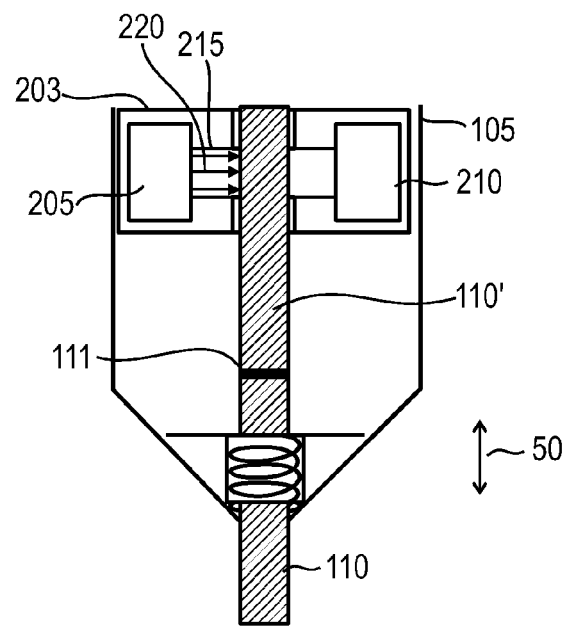
FIGS. 3A, 3B, and 3C are simplified schematic diagrams showing tip position sensing with a rectangular aperture formed on the distal tip element in accordance with some embodiments of the present invention.
Figure 3B:
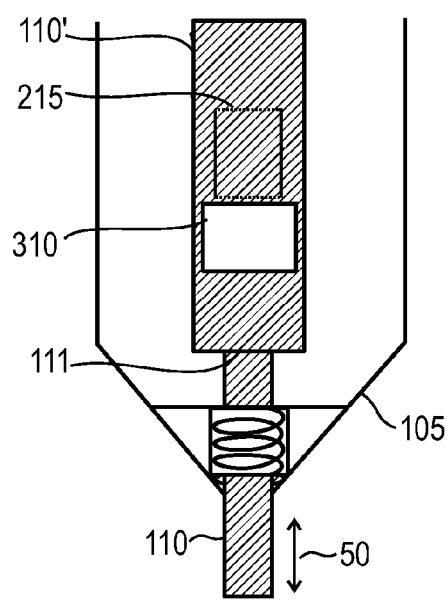
Figure 3C:
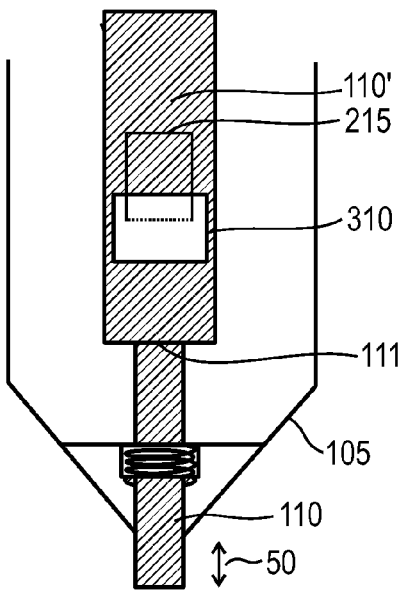

Reference is now made to FIGS. 3A-3C showing simplified schematic diagrams of tip position sensing with a rectangular aperture formed on the distal tip element in accordance with some embodiments of the present invention. In some exemplary embodiments, stylus 100 includes a distal tip element 110' that physically communicates with distal end 111 of tip 110 (or with tip 110), and the emitter 205 and detector 210 detect axial movement of the distal tip element 110' across opening 215. Typically, a movement pattern of the tip and the distal tip element are identical. Optionally, the distal tip element has a shape and/or size that are different than the shape or size of tip 110.

According to some embodiments of the present invention distal tip element 110' includes an aperture 310 that generally doesn't overlap with opening 215 of mechanical housing 203 while the stylus is in a neutral state (FIG. 3B) so that light rays 220 are obstructed during a neutral state of the tip. However, as tip 110 begins to recede into housing 105 (in response to contact pressure on the tip), aperture 310 begins to overlap with opening 215 (FIG. 3C) so that at least a portion light rays 220 can pass through aperture 310 toward detector 210. Alternatively, aperture 310 is aligned with opening 215 in a neutral state and is misaligned with opening 215 in a maximum pressure state, e.g. maximum receding of tip 110 into housing 105.

Figure 4A:
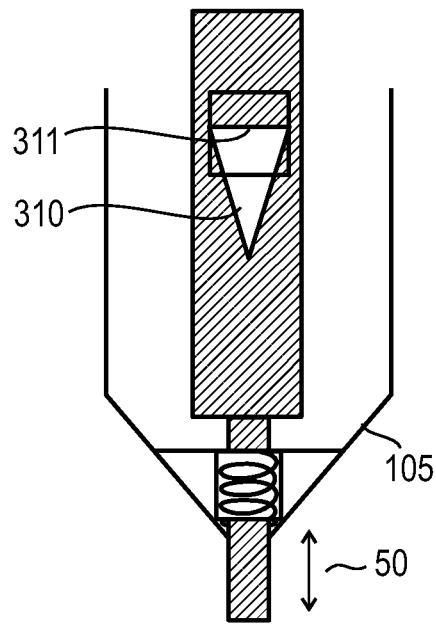
FIGS. 4A, 4B, 4C and 4D are simplified schematic diagrams showing tip position sensing with a triangular aperture formed on the distal tip element in accordance with some embodiments of the present invention.
Figure 4B:
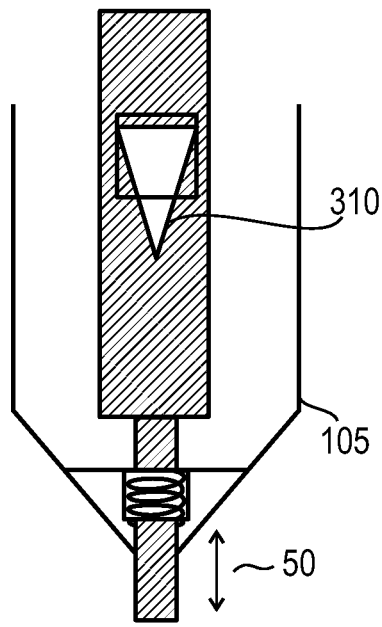
Figure 4C:
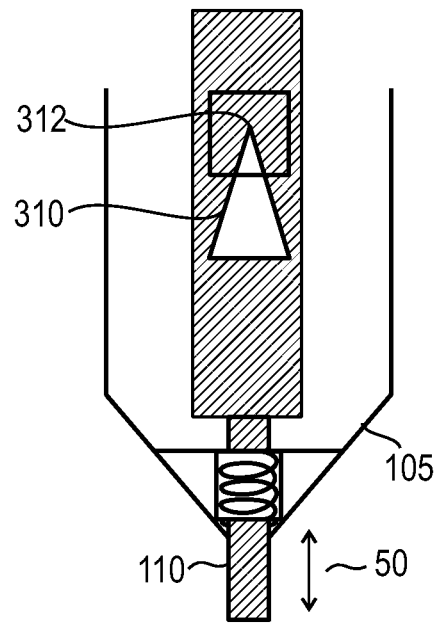
Figure 4D:
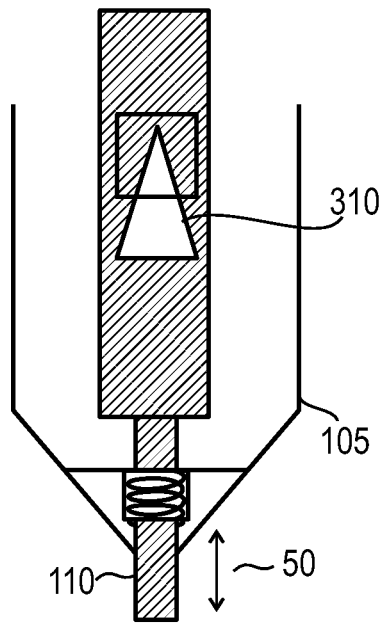

Reference is now made to FIGS. 4A-4D showing simplified schematic diagrams of tip position sensing with a triangular aperture formed on the distal tip element in accordance with some embodiments of the present invention. According to some embodiments of the present invention, distal tip element 110' includes a triangular aperture 310 that overlaps with opening 215 by varying amounts as tip 110 moves in axial direction 50. In some exemplary embodiments, in a neutral state of tip 110, triangular aperture 310 does not overlap with opening 215 so that light from emitter 205 toward detector 210 is completely obstructed. As pressure is applied to tip 110, a base 311 of triangular aperture 310 partially overlaps with opening 215, so that light is able to pass toward the detector (FIG. 4A). Additional pressure on the tip increases the overlapping area (FIG. 4B) but at a slower rate. Alternatively, a tip 312 of triangular aperture 310 initially overlaps with opening 215 (FIG. 4C) in response to applied pressure on tip 110. In such a case, the optical sensor will be less sensitive to an initial transfer from a neutral state to a contact pressure state but as the pressure is increased the overlapping area between aperture 310 and opening 215 increases and the sensitivity is increased. Optionally aperture 310 has a trapezoid shape or other shape.

It is appreciated that although in the exemplary embodiments described herein, the emitter 205 and detector 210 where described and shown to face each other and to be positioned on opposite sides of the distal tip element, other arrangements are possible and included within the scope of the present invention. In some exemplary embodiments, emitter 205 and detector 210 are positioned on a common side of the distal tip element and optical signal 220 is received by detector 210 by reflection off of the distal tip element. Optionally, emitter 205 and detector 210 are comprised in a single unit, e.g. single unit with detecting portion centered that is around a surrounding emitting portion. In another optional embodiment, distal tip element includes an inclined reflecting surface that diverts optical signal 220 toward detector 210.

Optionally, more than one emitter 205 and/or detector 210 are used to detect movement of the distal tip element and/or sensor contact pressure on stylus tip 110.

Figure 5A:
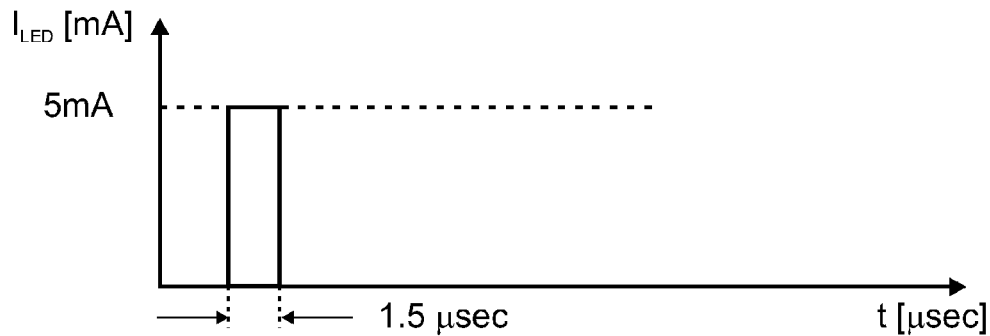
FIGS. 5A and 5B showing input and output signals of optical tip sensor in accordance with some embodiments of the present invention.
Figure 5B:
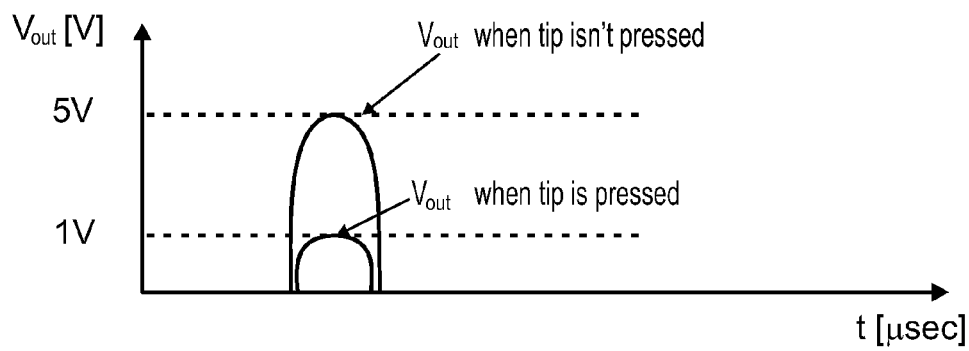

Reference is now made to FIGS. 5A and 5B showing input and output signals of optical tip sensor in accordance with some embodiments of the present invention. According to some embodiments of the present invention, a pulsed signal, e.g. a pulsed signal of 1.5 µsec durations is used for driving emitter 205. In some exemplary embodiments, the pulsed signal is repeated every 6-8 msec, e.g. 7.5 msec. In response to a pulsed emitting signal, output of detector 210 is sampled. In some exemplary embodiments, the dynamic range of the detector is set so that a maximum voltage output, e.g. 5V or 6V is detected while the tip is in a neutral state and a minimum voltage output, e.g. 0 to 1V or 1V is obtained while the tip is fully pressed and/or pressed at maximum pressure. Optionally, the opposite relationship may be defined based on the configuration of the distal tip element and the detector output.

Figure 6:
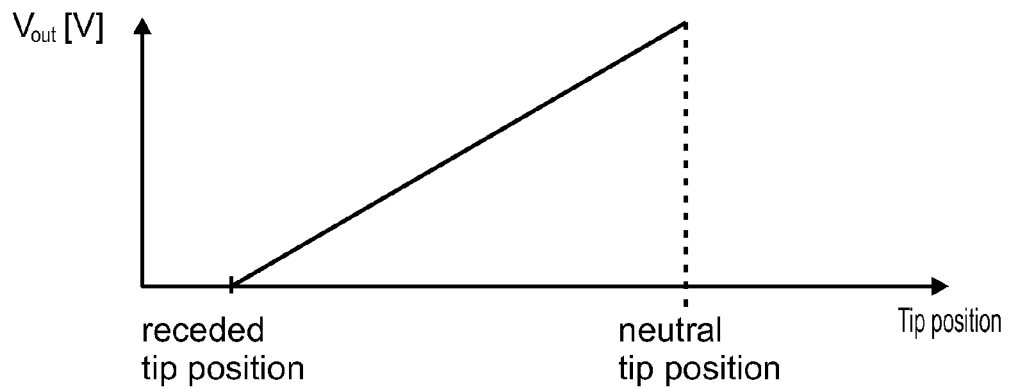
FIG. 6 is an exemplary graph of output voltage for a range of tip positions in accordance with some embodiments of the present invention.

According to some embodiments of the present invention, the relationship between the tip position (or displacement from neutral position) and the voltage output of the detector is a linear relationship as shown in FIG. 6. As the user applies pressure on the stylus tip, the tip changes its position and the voltage level detected at the amplifier's output decreases. Minimum voltage level is detected at the amplifier's output when the tip is fully pressed. FIG. 6 illustrates the voltage output ($V_{out}$) corresponding to the configuration illustrated in FIGS. 2A-2C. In some exemplary embodiments, the dynamic range of the output voltage (between minimum and maximum output voltage) is between 1-4V, e.g. 1.75 V.

According to some embodiments of the present invention, e.g. for configurations described in reference to FIG. 4A-4D, the relationship between tip displacement and output voltage is linear. Optionally, a steeper slope is provided near the neutral state of the stylus, e.g. near 0 displacement of the tip to clearly differentiate between hover state and stylus touching state. Non-linearity can be achieved by non-linear properties of the resilient element or by shape of the aperture. Optionally, the output voltage increases as the tip is pressed.

As can be apparent to a person skilled in the art, different configurations of the shape of the stylus tip and/or stylus tip's aperture and/or shape of the light source and/or shape of the light detector result in different profiles of the current output ($I_{out}$) vs. tip position. This further result in different profiles of the voltage output ($V_{out}$) vs. pressure applied. Typically, the output of detector 210 is a voltage after amplification.

Typically, the dynamic range of $V_{out}$ can be adjusted during calibration by dynamically adjusting maximum $V_{out}$ during user operation of stylus 100. In some exemplary embodiments, the optical sensor is calibrated by adjusting the duration of the input pulse and/or adjusting the current of the input pulse to obtain a desired dynamic range for a defined range of tip axial movement, e.g. a dynamic range between 1-6V for axial movement between 0-350 μm. Optionally, the current output of the detector (as opposed to the voltage) is sampled and used to determine tip position.

According to some embodiments of the present invention, contact pressure and/or tip position is determined from $V_{out}$ based on a look up table, e.g. a look up table stored in circuitry of stylus 100 and/or a formula, e.g. with digital compensation. Optionally, contact pressure and/or tip position is determined by an associated digitizer in response to receiving input regarding $V_{out}$. Optionally, the input received by the digitizer is frequency that corresponds to voltage, tip state, and/or pressure state of the stylus.

Figure 7:
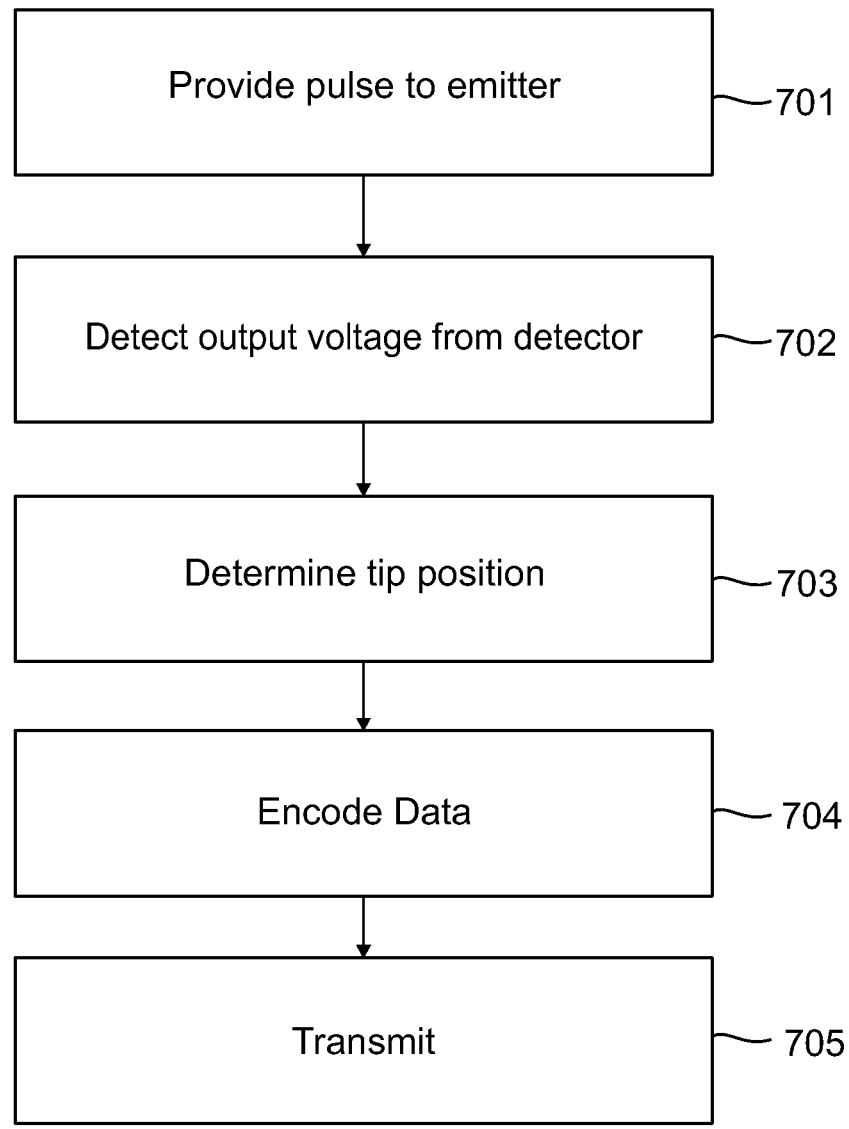
FIG. 7 is a simplified flow chart describing an exemplary method for transmitting tip position from a stylus in accordance with some embodiments of the present invention.

Reference is now made to FIG. 7 showing simplified flow chart describing an exemplary method for transmitting tip position from a stylus in accordance with some embodiments of the present invention. According to some embodiments of the present invention a pulse is periodically transmitted to emitter 205 (block 701). In response a voltage output is detected and/or sampled from detector 210 (block 702). Optionally, a tip position and/or a pressure state is determined from the voltage output, e.g. with a lookup table (block 703). According to some embodiments of the present invention, voltage output, tip position and/or pressure information is encoded (block 704). According to some embodiments of the present invention, the voltage output and/or tip position information is encoded by FM. Optionally, digital encoding, e.g. FSK, PSK, or ASK encoding is used to encode tip position and/or pressure state. According to some embodiments of the present invention, the modulated signal is transmitted, e.g. transmitted via tip 110 of stylus 100 (block 705).

Pressure Tip State Calibration

According to some embodiment, pressure information is used by a digitizer to differentiate between a hover operational state and a tip operational state. Typically, during a hover operational state, the stylus functions as a pointer. An initially applied pressure causes the stylus to switch to tip operational state where the stylus can provide input commands such as a mouse click command and/or be used for drawing. In some exemplary embodiments, it is required that an initial small force will cause a significant movement of the stylus tip to indicate the switching from hover state to tip state. Optionally, the additional pressure applied on stylus tip results in a thicker drawn line on a display of a host computer.

Figure 8:
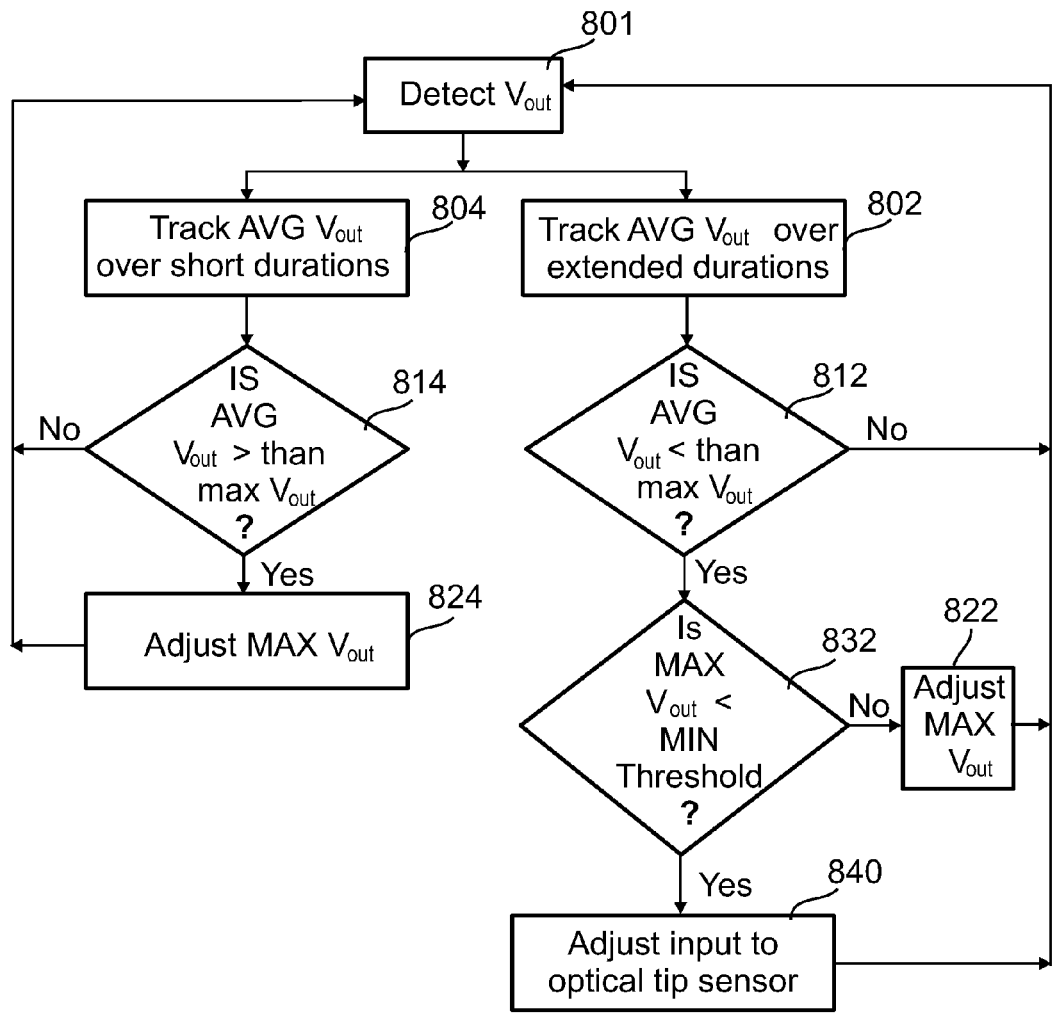
FIG. 8 is a simplified flow chart of an exemplary method for dynamically adjusting threshold for identifying a neutral tip position in accordance with some embodiments of the present invention.

Reference is now made to FIG. 8 showing a simplified flow chart of an exemplary method for dynamically adjusting threshold for identifying a neutral tip position in accordance with some embodiments of the present invention. The exemplary method described in FIG. 8 corresponds to embodiments where maximum $V_{out}$ corresponds to a neutral state of the stylus tip and minimum $V_{out}$ corresponds to maximum pressure applied to pen tip. As can be apparent to a person skilled in the art, a similar method can be applied for embodiments where minimum $V_{out}$ corresponds to a neutral state and maximum $V_{out}$ corresponds to a maximum pressure applied to pen tip, and such methods are within the scope of the present invention although not explicitly described.

According to some embodiments of the present invention, a threshold for identifying a neutral tip position is dynamically adjusted to avoid errors in differentiating between a hover operation state and a tip operational state of the stylus. Adjustments can be made to increase a threshold value beyond a previous maximum output value or decrease the threshold value to a value previously associated with a stylus tip state. Typically, adjustments are required to compensate for drift due to mechanical fatigue and environmental conditions. According to some embodiments of the present invention, the adjustments are made by circuitry included in the stylus.

According to some embodiments of the present invention, outputs from detector 210 are sampled (block 801). From the outputs average values of the output, e.g. $V_{out}$ are accumulated and compared to threshold for identifying a neutral tip position, e.g. maximum $V_{out}$. In some exemplary embodiments, averages accumulated over short durations (block 804) are used to increase a currently defined maximum $V_{out}$. Since increasing the maximum $V_{out}$ does not potentially put the threshold within a range defined for stylus tip state a decision to update can be made with high confidence and can be made with a few sampled data points. Optionally, averages over 2-5 cycles are used to increase a currently defined maximum $V_{out}$. If the average value is above a currently defined maximum $V_{out}$ (block 814), maximum $V_{out}$ is adjusted (block 824). Typically, the maximum $V_{out}$ is adjusted to the average value determined over the short duration. Optionally averages of $V_{out}$ are only calculated if a $V_{out}$ above a currently defined maximum is detected.

Alternatively, averages accumulated over longer durations (block 802) are required to decrease a currently defined maximum $V_{out}$. Since decreasing the maximum $V_{out}$ does potentially put the threshold within a range defined for stylus tip operational state, a decision to update requires a plurality of sampled data points to confirm that the change is required. Optionally, averages taken over 1-10 minutes are used to decrease the maximum $V_{out}$ used to define transition between hover and tip operational state.

An additional consideration when reducing defined maximum $V_{out}$ is that the dynamic range of the optical sensor and thereby its sensitivity may be significantly reduced. In some exemplary embodiments, when maximum $V_{out}$ is below a pre-defined minimum value (block 832) input to the optical sensor (or a parameter of the optical sensor) is adjusted (block 840). Optionally, when $V_{out}$ is greater than a maximum $V_{out}$ input to the optical sensor (or a parameter of the optical sensor) is also adjusted. Typically, the input current to the emitter is increased. Optionally, the duration of the pulse is increased. Optionally, amplification of the detector output is increased to increase the dynamic range of the output. This is achieved due to the feedback loop between emitter 205 and detector 210.

In some exemplary embodiments, if the minimum threshold is not reached and the average value is below a currently defined maximum $V_{out}$ (block 812) the threshold is adjusted (block 822). Typically, the threshold is adjusted to the average value determined over the extended duration.

According to some embodiments of the present invention, the stylus can either adjust maximum $V_{out}$ (thus changing the dynamic range) or adjust the optical sensor to achieved a pre-defined maximum $V_{out}$, e.g. an absolute value for maximum $V_{out}$ is defined and the calibration unit is operable to maintain it by adjusting parameters of the optical sensor.

In some exemplary embodiments, in response to determining a drift in the output reflecting a neutral state of the stylus, input to the optical tip sensor is adjusted and the pre-defined threshold output values are maintained. According to some embodiments of the present invention, the dynamically adjusting threshold for identifying a neutral tip position provides for closed loop feedback system, where the input to the optical tip sensor which changes output is controlled by the stylus itself.

Stylus Transmission Protocol

Figure 9A:
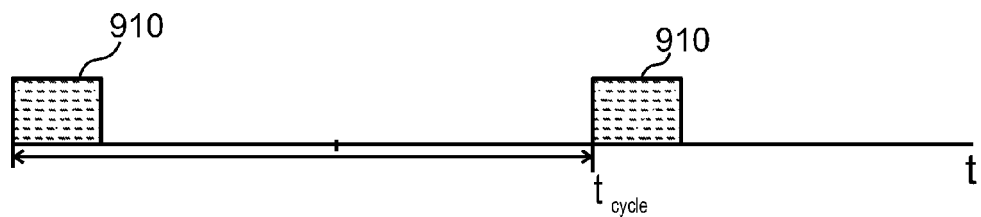
FIGS. 9A, 9B and 9C are simplified exemplary time lines showing transmission pulses transmitted by a stylus in accordance with some embodiments of the present invention.
Figure 9B:
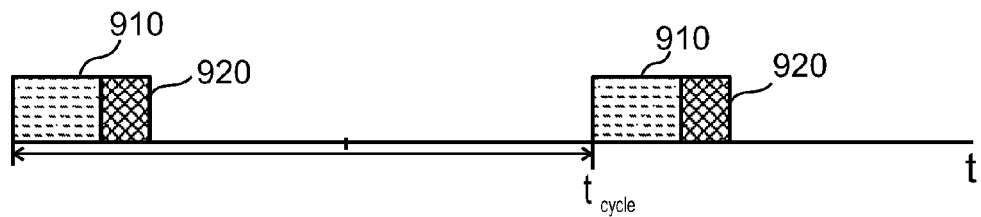
Figure 9C:
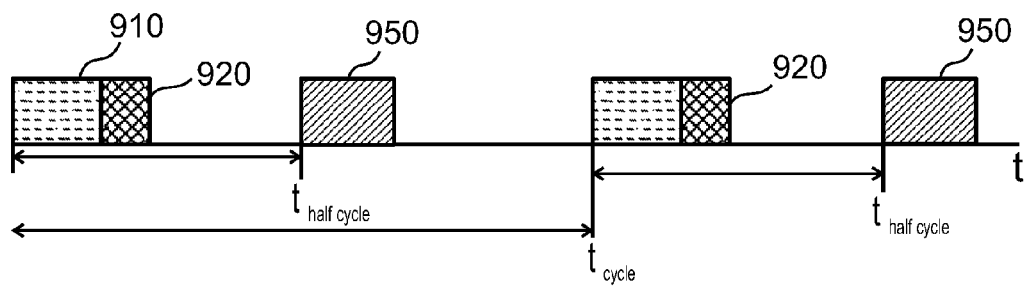

Reference is now made to FIG. 9A-9C showing simplified exemplary time lines of transmission pulses transmitted by a stylus in accordance with some embodiments of the present invention. According to some embodiments of the present invention, a signal transmitted by stylus 100 includes both analog and digital encoded information. According to some embodiments of the present invention, stylus 100 transmits a position signal pulse 910 over each transmission cycle $t_{cycle}$. Typically, position signal pulse 910 is used by a digitizer to determine interaction position of the stylus. Optionally, position signal pulse 910 is an AC pulse with frequency 28,125 Hz. Optionally, the pulse duration is between 1.25-1.3 msec. Typically, the transmission cycle period, $t_{cycle}$ has a period of 15 msec. According to some embodiments of the present invention, while the stylus is in a hover operational state (and the stylus tip is in a neutral position) no information regarding the pressure state of the tip is transmitted. In some exemplary embodiments, this features serves to clearly differentiate between hover and tip operational mode as well as save energy and/or battery life. The time span over which a stylus is in tip operational mode is significantly less than the time span over which the stylus is in a hover operational mode. Typically, the position signal pulse 910 indicates a beginning of a stylus cycle by which the system is synchronized.

In some exemplary embodiments, position signal pulse 910 is accompanied by additional pulse signal(s) 920 providing additional information regarding the stylus, e.g. battery status, right click mode, eraser mode, color selection, identification code. Typically, the additional information is digitally encoded, e.g. using digital FSK, PSK or ASK encoding. Optionally, FSK with a start bit, $F_s$, a 0 bit, $F_0$ and 1 bit, $F_1$ is used for encoding. Optionally, a 4/7 Hamming code is used as ECC (Error Correction Code). Optionally a combination of analog and digital encoding is used. In some exemplary embodiments, stylus includes one or more buttons that a user can activate to select a right click mode, an eraser mode, and/or a color. Optionally, the stylus includes a button for toggling between right click and eraser mode and a signal pulse 920 is used to indicate toggle selection. Optionally right click and eraser mode is differentiated by PSK encoding. Optionally, during right click mode and eraser mode, the other additional information pulses are not transmitted, e.g. right click and eraser mode have priority. It is noted that the duration of pulse 920, e.g. its width, can be the same or different from that of pulse 910.

According to some embodiments of the present invention, a pressure signal pulse 950 is transmitted at a pre-defined frequency. Typically, pressure signal pulse 950 is a frequency modulated pulse signal, e.g. by associating each pressure level with a pre-defined frequency. In some exemplary embodiments, a pressure signal pulse 950 is transmitted only when the stylus is in a tip operational mode, e.g. contact pressure is sensed on the stylus tip. Optionally, right click/eraser mode information is transmitted along with pressure signal pulse 950.

In some exemplary embodiments, pressure signal pulse 950 is transmitted at a half cycle of transmission, e.g. at $t_{1/2cycle}$. Optionally, pressure signal pulse 950 is additionally used for positioning. Optionally, the pulse duration of the pressure signal pulse 950 is identical to that of position signal pulse. Typically, analog encoding is used to transmit the pressure state of the stylus tip. Optionally, the encoding is by frequency modulation of pressure signal pulse 950 over a spectrum between 25 KHz-30 KHz. Optionally, the frequencies used for the position signal pulse 910 and/or pulse 920 are orthogonal with respect to the frequency used for finger touch detection so that stylus and finger touch can be simultaneously detected. In some exemplary embodiments, transmitting pressure signal 950 at $t_{1/2cycle}$ effectively doubles the report rate, e.g. to 133 Hz instead of 66 Hz, during tip operational state as compared to hover operation state. In such a manner energy can be conserved over a hover operational mode which typically requires less accuracy. Optionally, stylus 100 includes a power switch to turn off transmission (and operation of the stylus) while not in use. Optionally, the power switch includes a tilt sensor operable to sense that the stylus is in a reclined position indicating that the stylus is not in use. In some exemplary embodiments, in response to low battery output, transmission cycle period of position signal 910 is increased, e.g. to 22.5 msec.

Exemplary Digitizer Sensor for Use with Stylus

Figure 10:
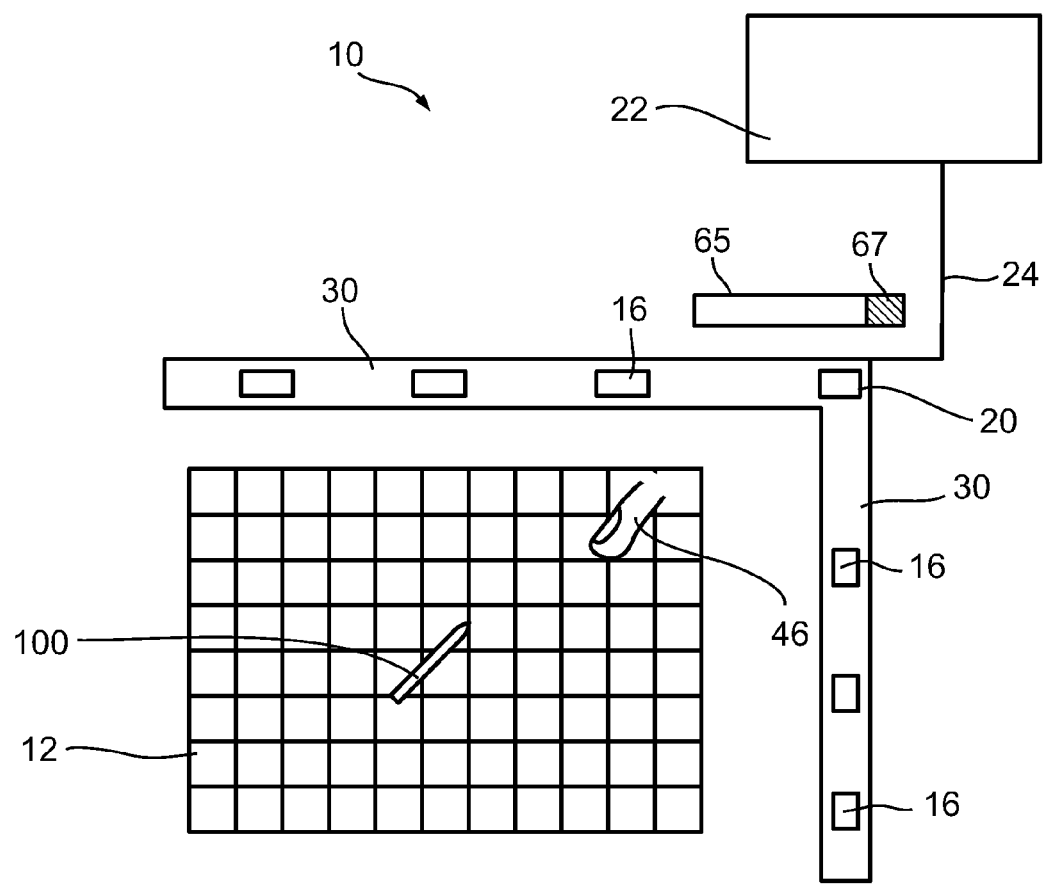
FIG. 10 is a simplified block diagram of a digitizer system for use with a signal transmitting stylus in accordance with some embodiments of the present invention.

Reference is now made to FIG. 10 describing a digitizer system for use with a signal transmitting stylus in accordance with some embodiments of the present invention.

The digitizer system 10 may be suitable for any computing device that enables interactions between a user and the device, e.g. mobile computing devices that include, for example, FPD screens. Examples of such devices include Tablet PCs, pen enabled lap-top computers, tabletop computer, PDAs or any hand held devices such as palm pilots and mobile phones. According to some embodiments of the present invention, the digitizer system comprises a sensor 12 including a patterned arrangement of conducting lines, which is optionally transparent, and which is typically overlaid on a FPD. Typically sensor 12 is a grid based sensor including horizontal and vertical conducting lines. Typically the sensor provides for capacitive touch detection.

According to some embodiments of the present invention, circuitry is provided on one or more PCB(s) 30. According to some embodiments of the present invention, one or more ASICs 16 positioned on PCB(s) 30 comprises circuitry to sample and process the sensor's output into a digital representation. The digital output signal is forwarded to a digital unit 20, e.g. digital ASIC unit also on PCB 30, for further digital processing. According to some embodiments of the present invention, digital unit 20 together with ASIC 16 serves as the controller of the digitizer system and/or has functionality of a controller and/or processor. Output from the digitizer sensor is forwarded to a host 22 via an interface 24 for processing by the operating system or any current application.

According to some embodiments of the present invention, sensor 12 comprises a grid of conductive lines made of conductive materials, optionally Indium Tin Oxide (ITO), patterned on a foil or glass substrate. The conductive lines and the foil are optionally transparent or are thin enough so that they do not substantially interfere with viewing an electronic display behind the lines. Typically, the conductors are input to amplifiers included in ASIC 16. Optionally the amplifiers are differential amplifiers. Typically, the parallel conductors are spaced at a distance of approximately 2-8 mm, e.g. 4 mm, depending on the size of the FPD and a desired resolution. Optionally, the ends of the lines remote from the amplifiers are not connected so that the lines do not form loops.

Additionally, ASIC 16 optionally includes one or more filters to remove frequencies that do not correspond to frequency ranges used for excitation and/or obtained from objects used for user interactions. Optionally, filtering is performed prior to sampling. The signal is then sampled by an A/D, optionally filtered by a digital filter and forwarded to digital ASIC unit 20, for further digital processing. Alternatively, the optional filtering is fully digital or fully analog.

According to some embodiments of the invention, digital unit 20 receives the sampled data from ASIC 16, reads the sampled data, processes it and determines and/or tracks the position of physical objects, such as a stylus 100, a finger 46, and/or an electronic tag touching the digitizer sensor from the received and processed signals. According to some embodiments of the present invention, digital unit 20 determines the presence and/or absence of physical objects, such as stylus 100, and/or finger 46 over time. Calculated position is sent to the host computer via interface 24.

According to some embodiments of the present invention, digital unit 20 determines the tip pressure applied on stylus 100 based on encoded signals transmitted by the stylus, e.g. analog encoded signals. In some exemplary embodiments of the present invention hovering of an object, e.g. stylus 100, finger 46 and hand, is also detected and processed by digital unit 20. According to some embodiments of the present invention, hovering and touching elements are differentiated by detection of a pressure signal pulse 950. Exemplary methods for detecting pressure state of a stylus tip and/or for identifying changes in signal frequency to determine a pressure state of a stylus tip is described in detail in U.S. patent application Ser. No. 12/232,811 filed on Sep. 24, 2008, entitled "Method for Identifying Changes in Signal Frequencies Emitted by a Stylus Interacting with a Digitizer Sensor" the contents of which is incorporated herein by reference. According to some embodiments of the present invention, the digitizer calculates the pressure level from the frequency transmitted in pulse 950 by a formula or a look-up table.

According to some embodiments of the present invention, digitizer system 10 includes a stylus garage 65 for storing stylus 100 while not being used. Optionally, stylus garage 65 includes a charger 67 for charging a battery of stylus 100. Optionally, stylus 100 is powered with a wire based in stylus garage 65 or with electrical decoupling. Optionally digitizer 100 includes an excitation coil surrounding sensor 12 for transmitting a triggering signal to stylus 100.

Digitizer systems used to detect stylus and/or finger tip location may be, for example, similar to digitizer systems described in U.S. Pat. Nos. 6,690,156, 7,292,229 and/or No. 7,372,455, all of which are hereby incorporated by reference. Additionally, styluses may be, for example, similar to styluses described in incorporated US Patent Application Publication No. 20080128180. Embodiments of the present invention will also be applicable to other digitizer systems known in the art, depending on their construction. Embodiments of the present invention will also be applicable to other digitizer sensors known in the art, e.g. sensors comprising loop coils.

According to some exemplary embodiments, stylus 100 is operable to be used with a capacitive touch screen. Optionally, stylus 100 can be added as a stand-alone product to an existing capacitive touch screen that includes circuitry that supports stylus interaction.

Capacitive Based Tip Sensor

Although an optical tip sensor has been described herein for detecting small displacements in response to contact pressure applied on the tip it is noted that a capacitive based tip sensor may also be used.

In some exemplary embodiments, a variable capacitor is used to determine changes in tip position. According to some embodiment, the capacitance value of the variable capacitor changes in response to a distance change between two sets of conductive plates which are facing each other. According to some embodiments, the capacitance value of the variable capacitor changes in response to alignment between a set of conductive plates of the capacitor. According to some embodiments, the variable capacitor comprises a first set of stationary conductive plates and a second set of movable conductive plates that face the first set. Typically, the variable capacitor comprises two stationary conductive plates facing a movable conductive plate. Optionally, electrical communication, e.g. tethered communication with the stylus circuitry is only required with the stationary conductive plates and is not required for the movable conductive plates. According to some embodiments of the present invention, the variable capacitor is operable to detect the movement and/or displacement of a distal tip element.

According to some embodiments of the present invention, the capacitance value of the variable capacitor changes in response to a position change of the stylus tip. The stylus tip position and/or displacement can be calculated from a detected capacitance value of the variable capacitor. According to some embodiments of the present invention, the applied pressure can be calculated from the detected object position and/or displacement. According to some embodiments, the applied pressure is calculated from the detected capacitance value of the variable capacitor. An advantage of such a set up is that the electronic is not connected to a movable part.

Figure 11A:
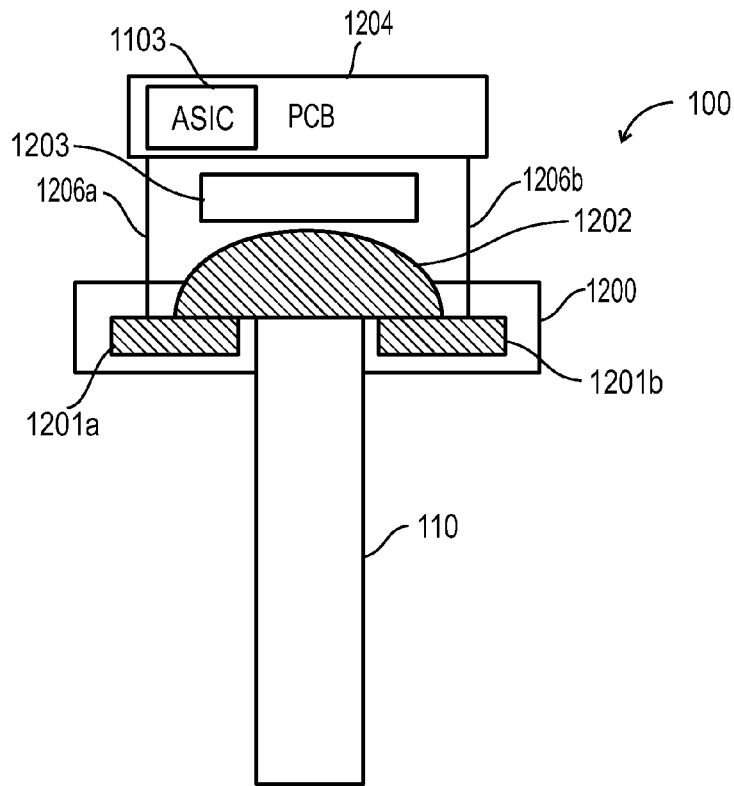
FIGS. 11A, 11B, 11C and 11D showing simplified block diagrams of two exemplary capacitor based tip sensors operated within a stylus in accordance with some embodiments of the present invention.
Figure 11B:
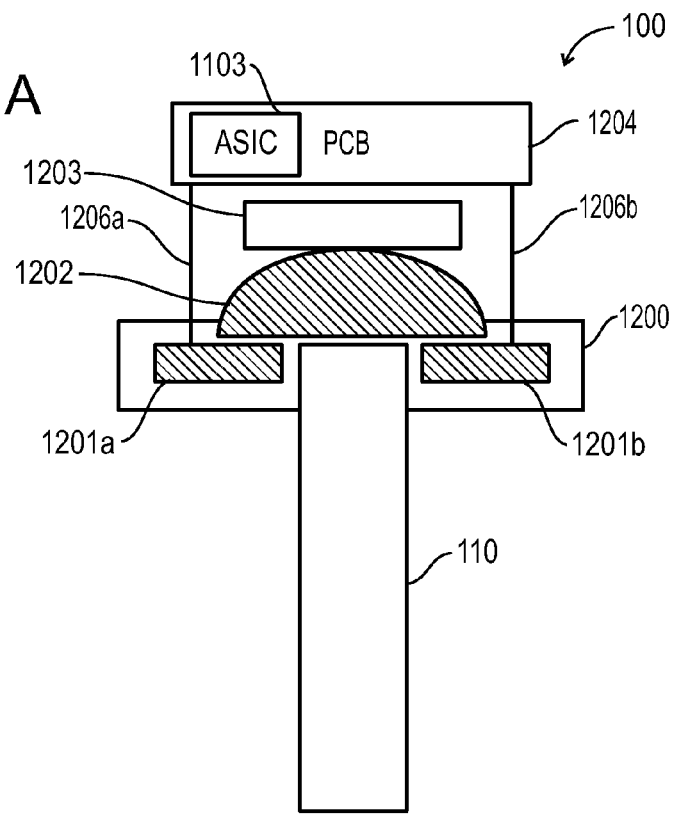

Reference is now made to FIGS. 11A and 11B showing a simplified block diagram of an exemplary capacitor based tip sensor operated within a stylus in accordance with some embodiments of the present invention. According to some embodiment of the present invention, the stylus 100 comprises a variable capacitor 1200 comprising a set of two stationary conductive plates 1201a and 1201b facing a movable conductive plate 1202. According to some embodiment of the present invention, movable conductive plate 1202 is in physical communication with stylus tip 110 and moves in accordance with the stylus tip movement. Optionally, the movable conductive plate 1202 is mechanically connected to an alternate distal tip element that is in physical communication with stylus tip 110.

According to some embodiment of the present invention, movable conductive plate 1202 has a dome shape at one end. Optionally, movable conductive plate 1202 has a different shape. Typically, the dome shaped end of the movable conductive plate 1202 faces an elastic stopper 1203. Typically, the dome shaped end is used to increase the overlapping area between conductive plate 1202 and elastic stopper 1203 when pressure is applied. Optionally, elastic stopper 1203 is an elastic O-ring.

According to some embodiment of the present invention, stationary conductive plates 1201a and 1201b are connected through electrical connectors 1206a and 1206b to stylus PCB unit 1204. Typically, stylus PCB unit 1204 comprises a stylus ASIC unit 1103.

According to some embodiment of the present invention, when no pressure is applied on stylus tip 110, stationary conductive plates 1201a and 1201b are in contact with movable conductive plate 1202, as illustrated in FIG. 11A. Optionally, the distance between the two stationary conductive plates and the movable conductive plate is minimal, e.g. 5-20 µm. Optionally, the distance between the two stationary conductive plates and the movable conductive plate is achieved by providing a spacer. Optionally, a thin spacer with high dielectric value is used. When no pressure is applied on the stylus tip, the distance between the two stationary conductive plates and the movable conductive plate is decreased up to a minimal distance, e.g. 0-20 µm and a maximum capacitance value ($C_{max}$) of the variable capacitor is detected.

Referring now to FIG. 11B, according to some embodiment of the present invention, as the user applies pressure on the stylus tip, movable conductive plate 1202 is drawn away from stationary conductive plates 1201a and 1201b, i.e. the distance between the two stationary conductive plates and the movable conductive plate increases. In an exemplary embodiment, the applicable distance is in the range of 0-500 µm. e.g. 0-200 µm. When maximum allowed pressure is applied on the stylus tip, the distance between the two stationary conductive plates and the movable conductive plate is maximal, e.g. 200 µm and minimum capacitance value ($C_{min}$) of the variable capacitor is detected. According to some embodiments of the present invention, the capacitance decreases as a function of increasing distance and the change in capacitance between a range defined by $C_{min}$ and $C_{max}$ is used to estimate the tip position and/or pressure state of the tip.

Figure 11C:
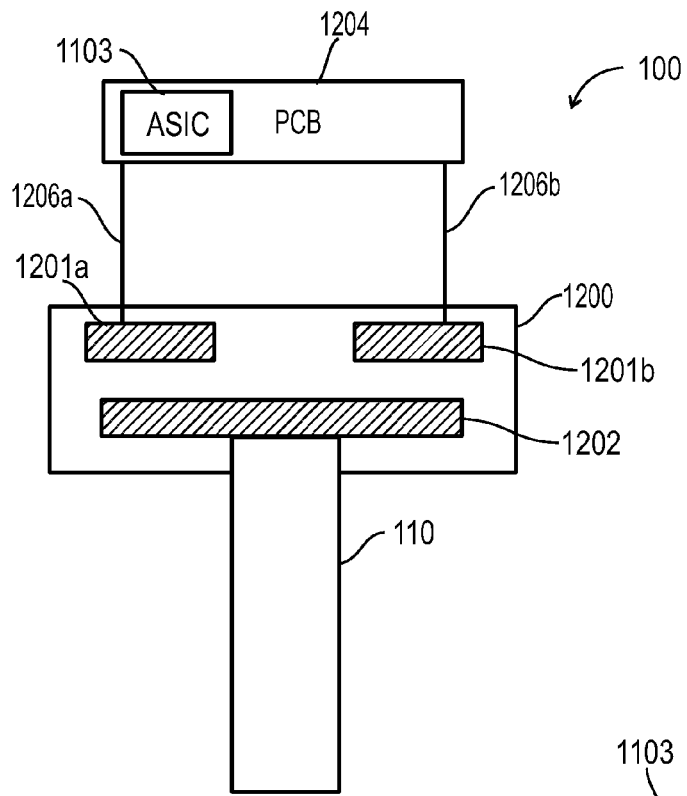
Figure 11D:
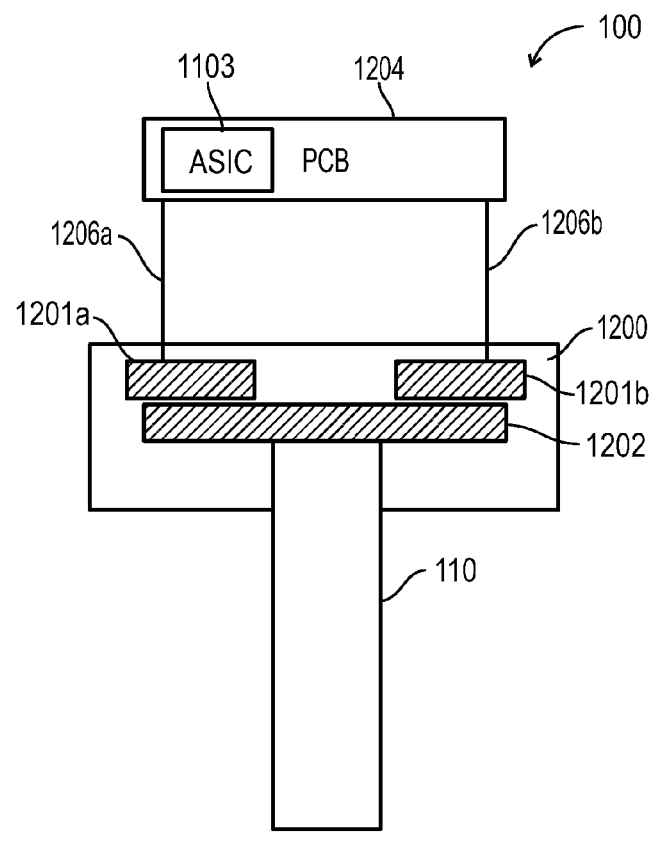

FIGS. 11C-11D illustrates an alternative construction the movable conductive plate 1202 is drawn closer to the two stationary conductive plates 1201a and 1201b when a user applies pressure on the stylus tip. As illustrated in FIG. 11C, when no pressure is applied on the stylus tip, the distance between the two stationary conductive plates and the movable conductive plate is maximal, e.g. 200 µm and minimum capacitance value ($C_{min}$) of the variable capacitor is detected. As illustrated in FIG. 11D, when maximum pressure is applied on the stylus tip, the distance between the two stationary conductive plates and the movable conductive plate is decreased up to a minimal distance, e.g. 0-20 µm and a maximum capacitance value ($C_{max}$) of the variable capacitor is detected.

Figure 12:
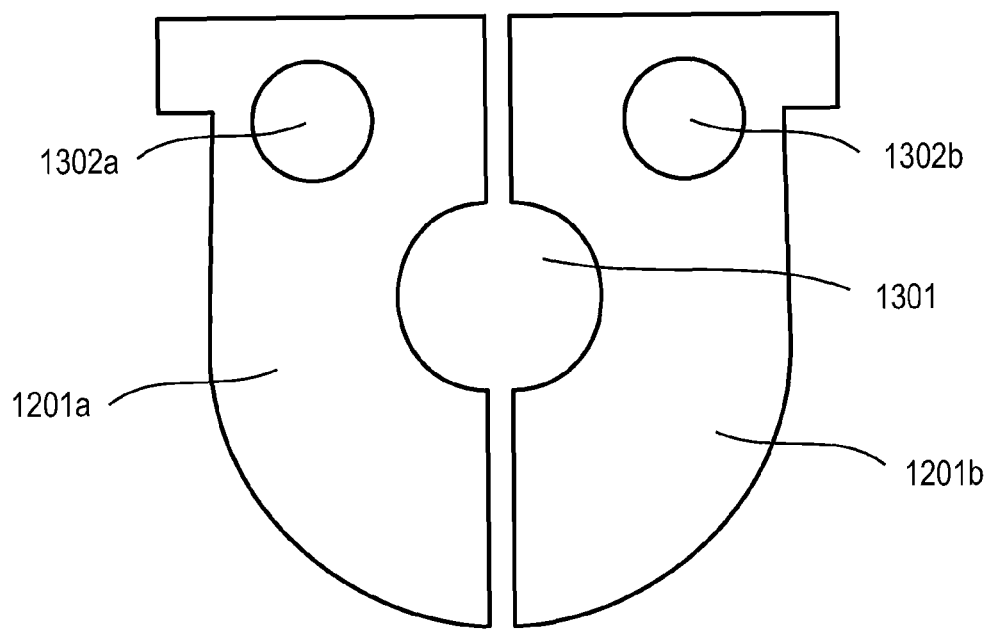
FIG. 12 is a simplified top view illustration of the two exemplary stationary conductive plates, in accordance with some embodiments of the present invention.

Reference is now made to FIG. 12 showing a simplified top view illustration of the two exemplary stationary conductive plates, in accordance with some embodiments of the present invention. According to some embodiments of the present invention, stationary conductive plates 1201a and 1201b have a semi-round shape with an opening 1301 in between, to enable the tip 110 movement. Optionally, the diameter of opening 1301 is a few mm, e.g. 1-2 mm. Typically, the opening corresponds to the distal tip element diameter.

According to some embodiments, electrical connectors 1206a and 1206b are connected to conductive plates 1201a and 1201b through pads 1302a and 1302b respectively. Optionally, connectors 1206a and 1206b are connected to conductive plates 1201a and 1201b through holes formed in the conductive plates.

Optionally, instead of changing the distance between opposing conductive plates, the overlapping area between the plates can change in response to tip movement.

Figure 13:
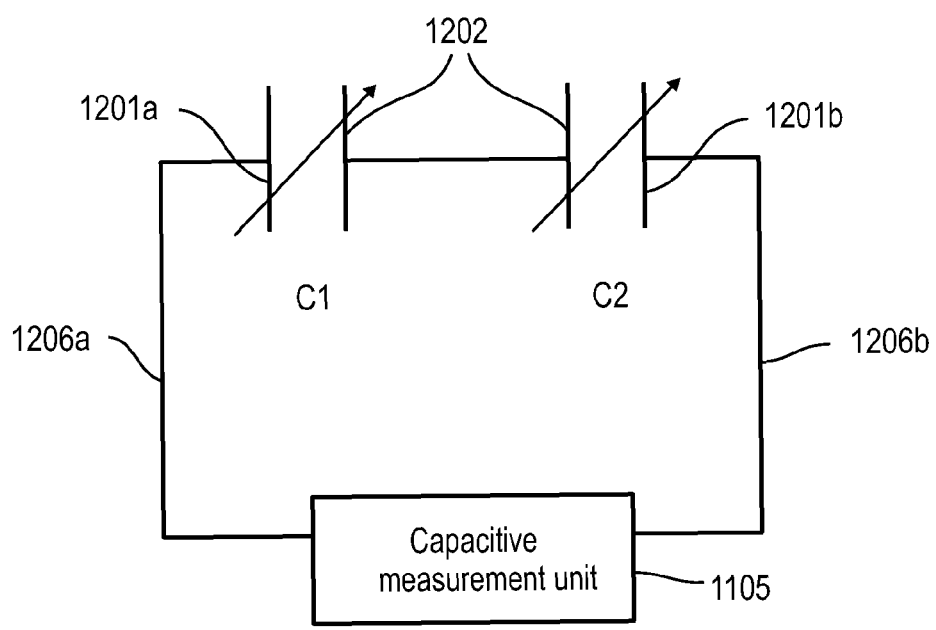
FIG. 13 is an exemplary electrical scheme of a variable capacitor 1200 in accordance with some embodiments of the present invention.

Reference is now made to FIG. 13 showing an exemplary electrical scheme of a variable capacitor 1200 in accordance with some embodiments of the present invention. According to some embodiments of the present invention, the mechanical structure of the variable capacitor, as illustrated in FIGS. 11A-11D, creates two variable capacitors $C_1$ and $C_2$ connected in series. The total capacitance value of the variable capacitor is in accordance with the following equation $C_{tot}=1/C_1+1/C_2$. In some exemplary embodiments, the two variable capacitors $C_1$ and $C_2$ are identical. The total capacitance $C_{tot}$ when the two variable capacitors $C_1$ and $C_2$ are identical is: $C_2/2=C_1/2$.

According to some embodiments of the present invention, the variable capacitors are connected to a capacitive measurement unit 1105. According to some embodiment of the present invention, capacitive measurement unit 1105 is operable to detect the total capacitance value of the variable capacitors, $C_{tot}$. Typically, the capacitive measurement unit 1105 is embedded in the stylus ASIC 1103 which is mounted on the stylus PCB 1204. Optionally, the capacitive measurement unit 1105 is an off-the-shelf unit, e.g. charge amplifier provided on the stylus electronics, e.g. ASIC or electronic circuit. The capacitive measurement unit 1105 determines the capacitance value of the variable capacitor in accordance with methods known in the art, e.g. by examining the charge time and/or discharge time of the capacitor. In an exemplary embodiment, the capacitive measurement unit is capable of detecting $\Delta C$ of 1-10 fF, e.g. 4 fF.

It is noted, that some of the methods described in reference to the optical sensor may be similarly applied to the capacitive based sensor.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. A computing system comprising:
a stylus configured for emitting a signal, the stylus including:
   at least one battery; and
   a switch operative to turn transmission of the signal ON/OFF,
   wherein the switch is operable to turn OFF transmission responsive to sensing that the stylus is in a reclined position indicating that the stylus is not in use;
a flat panel display;
a digitizer sensor overlaid on the flat panel display and operative to sense the signal emitted by the stylus, the digitizer sensor providing output;
a host computer operative to control display on the flat panel display and to receive the output provided by the digitizer sensor; and
a stylus garage configured for storing the stylus while not being used for interacting with the digitizer sensor and for recharging the at least one battery of the stylus while the stylus is stored in the garage.

2. The computing system according to claim 1, wherein the at least one battery is operative to power generation of the signal emitted by the stylus.

3. The computing system according to claim 2, wherein the stylus comprises a voltage regulator operative to regulate voltage from the at least one battery.

4. The computing system according to claim 1, wherein the stylus is operable to change its operation mode in response to low battery output.

5. The computing system according to claim 1, wherein the stylus is operable to increase a transmission cycle period of the signal responsive to low battery output.

6. The computing system according to claim 1, wherein the stylus is electrically connected to the stylus garage by a wired connection and wherein the stylus is powered via the wired connection.

7. The computing system according to claim 1, wherein the stylus switches off when in garage.

8. The computing system according to claim 1, wherein the stylus includes a tilt sensor operable to sense when the stylus is in a reclined position.

9. The computing system according to claim 1, wherein the signal emitted by the stylus is a pulsed signal that is emitted at a defined rate.

10. The computing system according to claim 1, wherein the stylus includes a writing tip and a pressure sensor operative to sense pressure applied on the writing tip.

11. The computing system according to claim 10, wherein the stylus comprises a signal generator operative to generate the signal emitted by the stylus and to encode the signal with a pressure state of the writing tip as sensed by the pressure sensor.

12. The computing system according to claim 10, wherein the signal emitted by the stylus is a pulsed signal that is emitted at a defined rate and wherein the stylus is operative to increase the rate at which the signal is emitted in response to sensing pressure applied on the writing tip.

13. The computing system according to claim 1, comprising a excitation coil surrounding the digitizer sensor, wherein the excitation coil is operative to transmit a triggering signal to the stylus.

14. The computing system according to claim 1, wherein the digitizer sensor is a grid based sensor that includes a patterned arrangement of conducting lines.

* * * * *